(12) United States Patent
Spurlin et al.

(10) Patent No.: US 10,711,366 B2
(45) Date of Patent: Jul. 14, 2020

(54) REMOVAL OF ELECTROPLATING BATH ADDITIVES

(71) Applicant: Lam Research Corporation, Fremont, CA (US)

(72) Inventors: Tighe A. Spurlin, Portland, OR (US); Jonathan D. Reid, Sherwood, OR (US)

(73) Assignee: Lam Research Corporation, Fremont, CA (US)

(*) Notice: Subject to any disclaimer, the term of this patent is extended or adjusted under 35 U.S.C. 154(b) by 42 days.

(21) Appl. No.: 15/894,643

(22) Filed: Feb. 12, 2018

(65) Prior Publication Data
US 2019/0203375 A1 Jul. 4, 2019

Related U.S. Application Data

(60) Provisional application No. 62/611,542, filed on Dec. 28, 2017.

(51) Int. Cl.
C25D 21/18 (2006.01)
B01D 36/00 (2006.01)
(Continued)

(52) U.S. Cl.
CPC ............ C25D 21/18 (2013.01); B01D 15/10 (2013.01); B01D 36/00 (2013.01); C25D 7/12 (2013.01);
(Continued)

(58) Field of Classification Search
None
See application file for complete search history.

(56) References Cited

U.S. PATENT DOCUMENTS 4,871,435 A * 10/1989 Denofrio ................ C25D 17/00
204/224 R
6,024,856 A 2/2000 Haydu et al.
(Continued)

FOREIGN PATENT DOCUMENTS

EP 1591563 11/2005

OTHER PUBLICATIONS

"International Application Serial No. PCT US2018 065831, International Search Report dated Apr. 8, 2019", 3 pgs.
(Continued)

Primary Examiner — Harry D Wilkins, III
(74) Attorney, Agent, or Firm — Schwegman Lundberg & Woessner, P.A.

(57) ABSTRACT

In one example, an electroplating system comprising a bath reservoir having a first inlet for feeding fresh electrolyte solution into the bath reservoir and a first outlet for bleeding used electrolyte solution out of the bath reservoir, a second inlet for receiving recycled electrolyte solution into the bath reservoir, and a second outlet for discharge of electrolyte solution from the bath reservoir. A plating cell is providing for electroplating an object, the plating cell has an inlet in direct or indirect fluid communication with the bath reservoir, and an outlet for discharge of electrolyte solution from the plating cell. An extraction column extracts by-products generated by the plating cell and has an inlet in direct or indirect fluid communication with the outlet of the plating cell, and an outlet for discharge of electrolyte solution from the extraction column. A first particle filter is disposed in a fluid pathway between the second outlet of the bath reservoir and the inlet of the plating cell, and a second particle filter is disposed in a fluid pathway between the outlet of the extraction column and the second inlet of the bath reservoir.

11 Claims, 15 Drawing Sheets

(51) Int. Cl.
*C25D 21/06* (2006.01)
*B01D 15/10* (2006.01)
*C25D 7/12* (2006.01)
*C25D 3/12* (2006.01)
*C25D 3/38* (2006.01)
*B01D 15/00* (2006.01)

(52) U.S. Cl.
CPC .............. *C25D 21/06* (2013.01); *B01D 15/00* (2013.01); *C25D 3/12* (2013.01); *C25D 3/38* (2013.01)

(56) References Cited

U.S. PATENT DOCUMENTS

| | | | |
|---|---|---|---|
| 6,391,209 | B1 | 5/2002 | Belongia et al. |
| 6,638,409 | B1* | 10/2003 | Huang .................... C25D 21/06 |
| | | | 204/238 |
| 2002/0112952 | A1* | 8/2002 | Blachier ............. C23C 18/1617 |
| | | | 204/228.1 |
| 2003/0042143 | A1 | 3/2003 | Dickinson et al. |
| 2005/0016857 | A1 | 1/2005 | Kovarsky et al. |
| 2006/0113006 | A1* | 6/2006 | Masuda .................... C25D 3/32 |
| | | | 205/302 |
| 2012/0105830 | A1 | 5/2012 | Pierce, Jr. et al. |
| 2016/0201213 | A1* | 7/2016 | Suzuki .................... C25D 17/02 |
| | | | 204/240 |

OTHER PUBLICATIONS

"International Application Serial No. PCT US2018 065831, Written Opinion dated Apr. 8, 2019", 8 pgs.

\* cited by examiner

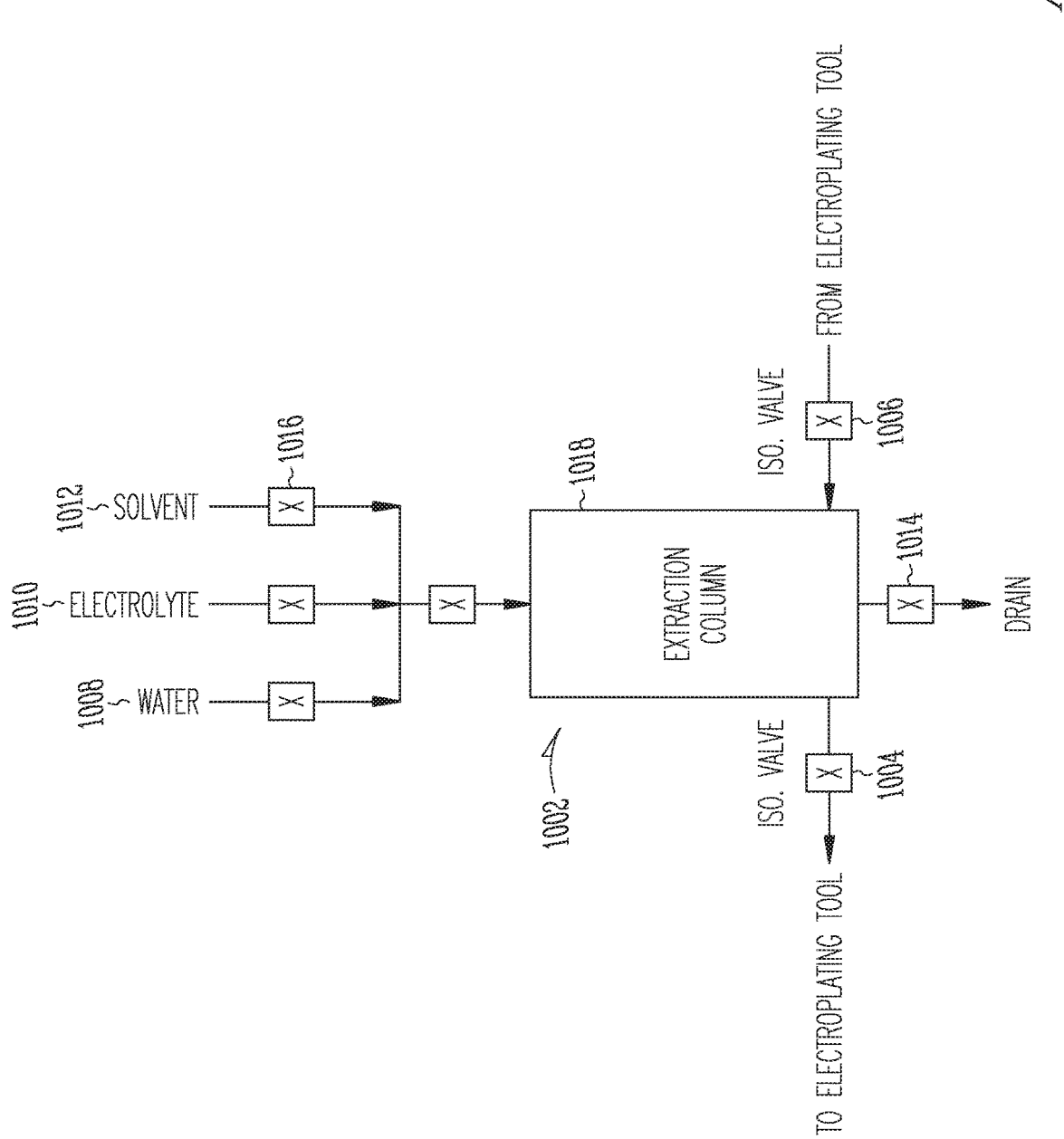

SOFTWARE COUNTER TRACKING

ADDITIVE CONCENTRATION: 10 MG/L
SOLUTION RUN THROUGH COLUMN: 500L
WEIGHT ADDITIVE RETAINED: 5000MG (ALGORITHM ESTIMATE OR DIRECT FROM CHEMICAL MONITORING)

COLUMN BED WEIGHT: 2.5KG
COLUMN CAPTURE EFFICIENCY: 500 MG COLUMN/1MG ADDITIVE
COLUMN CONSUMED COUNTER: (WEIGHT ADDITIVE*COLUMNCAPTURE EFF.) — 2.5KG
RECONDITION COLUMN CONDITION: CONSUMED COUNTER APPROACHING COLUMN BED WEIGHT

Fig. 11

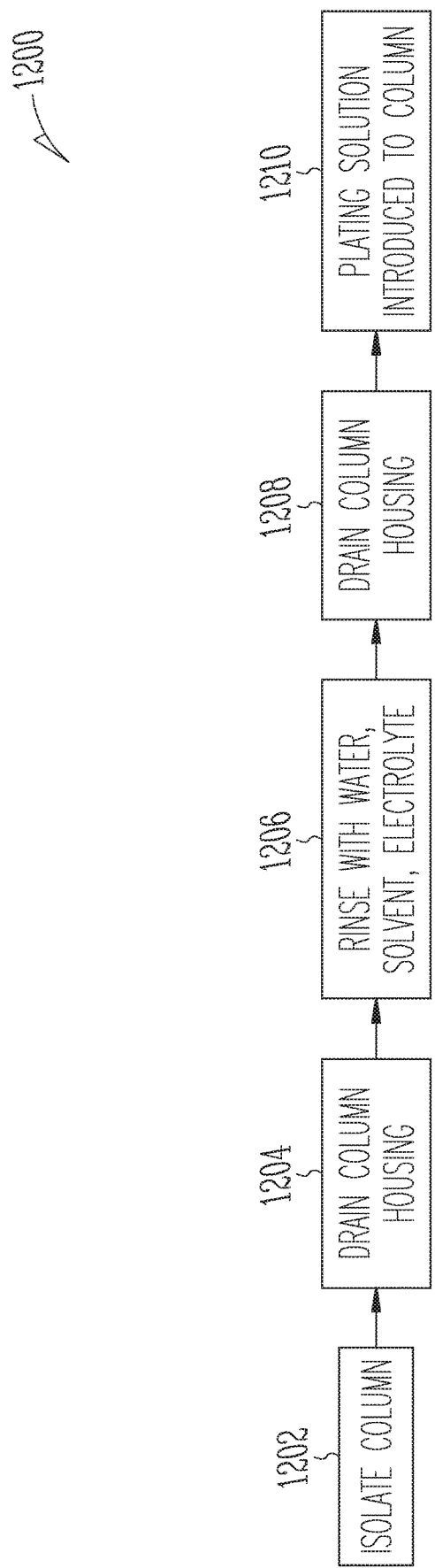

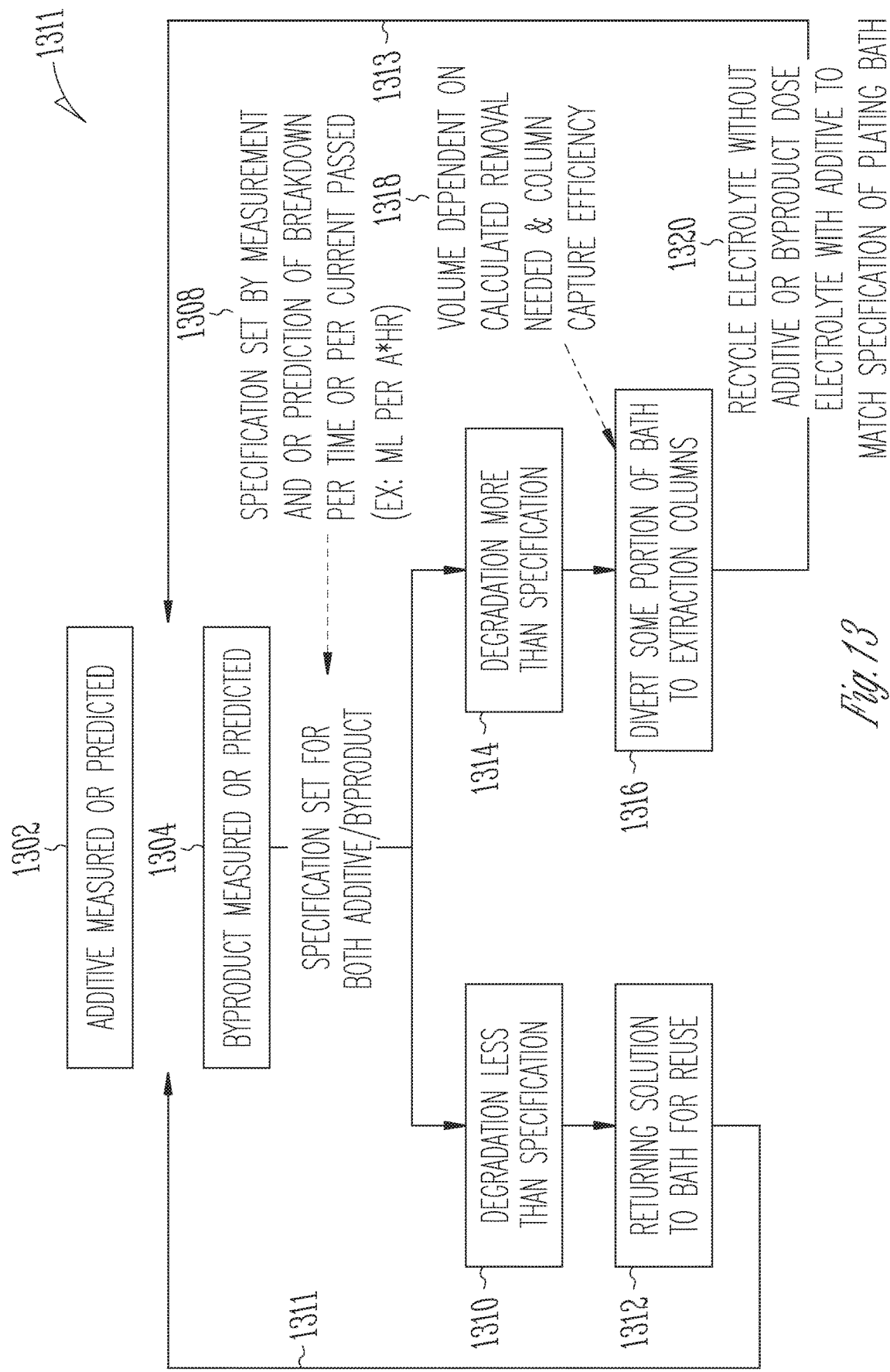

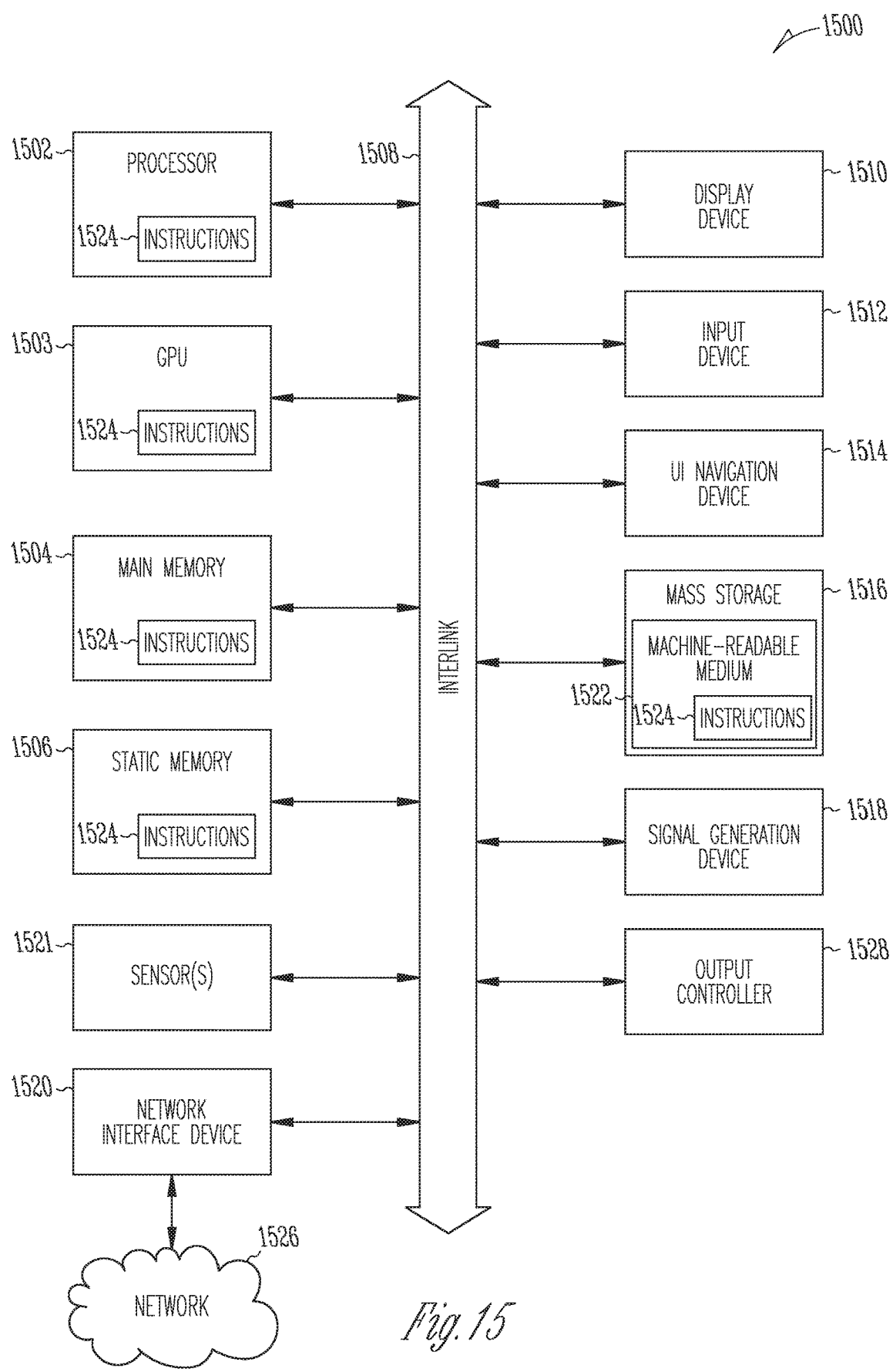

REMOVAL OF ELECTROPLATING BATH ADDITIVES

CLAIM OF PRIORITY

This application claims the benefit of priority, under 35 U.S.C. Section 119(e), to Spurlin et al, U.S. Provisional Application No. 62/611,542, filed Dec. 28, 2017, entitled "APPARATUS FOR REMOVAL OF ELECTROPLATING BATH ADDITIVES", which is incorporated herein by reference in its entirety.

FIELD

The present disclosure relates generally to electroplating systems and methods, and in particular to systems and methods for removing electroplating byproducts and additives from electroplating processes and electrolyte solutions enabling sophisticated interconnects and semi-conductor wafer construction.

BACKGROUND

In conventional electroplating methods, plating tools may be configured to use "bleed and feed" methods to retain byproducts in an electroplating reservoir bath below specified levels. These rough techniques may work sufficiently well for conventional copper plating baths for example, but have significant limitations when seeking to create more complex formations of nanometer size.

Further, electrodeposition of interconnects for nodes in sizes below approximately ten nanometers, for example, may require the use of tool platforms which employ special bath compositions which contain metal salts other than copper. These special bath compositions may also include inorganic salts, acids, and organic plating additives. The use of such compositions in plating techniques can exacerbate problems relating to bath maintenance due to organic additive breakdown.

The present disclosure seeks to address these drawbacks. It should be noted that the information described in this section is provided to provide the skilled artisan some context for the following disclosed subject matter and should not be considered as admitted prior art.

DESCRIPTION OF THE DRAWINGS

Some embodiments are illustrated by way of example and not limitation in the views of the accompanying drawings:

FIG. 10 is a diagrammatic view of an extraction column and associated valving, according to an example embodiment.

FIG. 11 illustrates example parameters for a counter tracker for tracking an extraction column lifetime and monitoring a status for triggering the reconditioning of the column, according to an example embodiment.

FIG. 12 illustrates example operations in a method, according to an example embodiment.

FIG. 13 is a diagram indicating example control points and operations for a method, according to example embodiments.

FIG. 15 is a block diagram illustrating an example of a machine upon which one or more example embodiments may be implemented, or by which one or more example embodiments may be controlled.

DESCRIPTION

Figure 1:
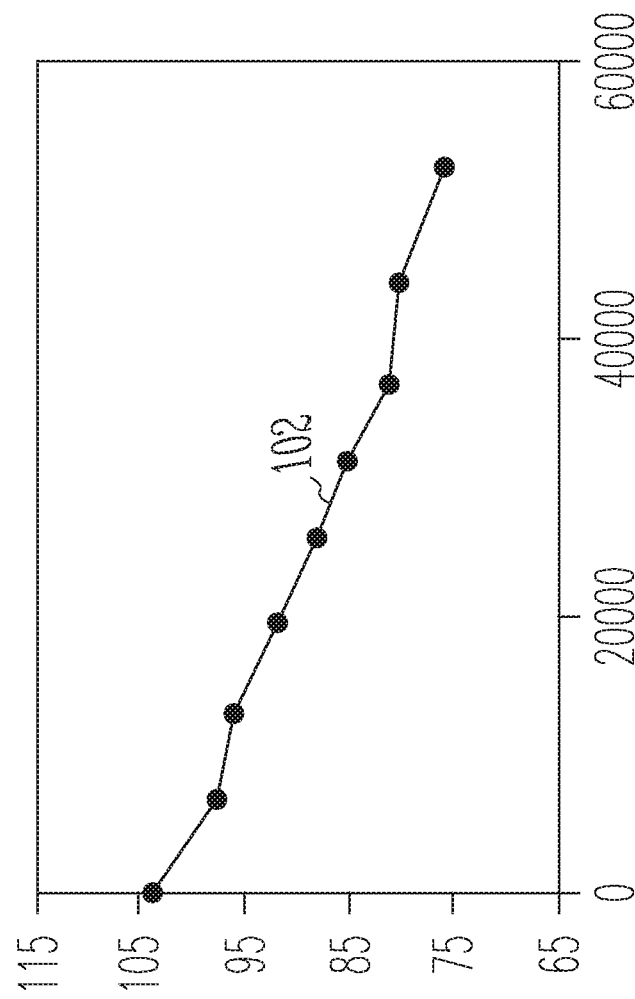
FIG. 1 is a graph depicting an example breakdown rate of an additive, according to an example embodiment.

The description that follows includes systems, methods, techniques, instruction sequences, and computing machine program products that embody illustrative embodiments of the present invention. In the following description, for purposes of explanation, numerous specific details are set forth in order to provide a thorough understanding of example embodiments. It will be evident, however, to one skilled in the art, that the present embodiments may be practiced without these specific details.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to any data as described below and in the drawings, that form a part of this document: Copyright LAM Research Corporation, 2017, All Rights Reserved.

Typically, copper (Cu) and cobalt (Co) electroplating baths break down to some degree with applied plating current. For example, the breakdown rate of additives in copper baths are usually below 0.5 ml per A*hr. while additives in cobalt baths can be as high as 30 ml per A*h. The higher rate of cobalt additive breakdown may, for example, generate electroplating baths which develop a substantial amount of electrochemically inactive components that can interfere with the electrodeposition process. These electrochemically inactive byproducts can cause defects on wafers such as areas of less plating, areas of no plating, wetting defects, and/or changes in nucleation, bottom up fill, and so forth. In some cases, standard "bleed and feed" methods used for traditional copper damascene plating baths are not economically feasible for these baths as the rate of bath disposal (i.e. repeated disposal of bath contents) is not economically feasible and is wasteful.

The graph 100 in FIG. 1 illustrates a relatively rapid breakdown of some additives that may be observed in cobalt electroplating baths, for example, with applied plating current over the course of 12 hrs. The units of the axes of the graph are as indicated, and a descending graph plotline 102 over time is visible in the view. The graph 100 shows the breakdown of an organic additive expressed in ml/L, with coulombs passed (Amps*s). The graph plot line 102 is representative of the breakdown of an organic additive during a period of twelve-hour cycling of wafers and illustrates the unhelpful effect of the buildup of byproducts in an electroplating bath.

The generation of byproducts can, in some instances, be offset by conventional "bleed and feed" techniques, but these may still interfere with void free deposition of metal into interconnect features. Plots of the type shown in FIG. 1 can be used to determine the breakdown of other additives in ml per current passed and time duration (ml per A*hr). The breakdown rate of additives in ml per A*hr. are commonly used, for example, in copper and cobalt electroplating baths to calculate and predict additive dosing and bleed and feed needed at certain times to maintain bath additives within a certain specification.

Again, in conventional electroplating methods, a solution is typically held in a main bath reservoir and delivered to a plating cell that passes current between a cathode (wafer) and anode. Current passing through the plating cell electrochemically degrades organic plating additives, which then build up in the bath over time. A chemical monitoring system and additive dosing system may be utilized to bleed and feed these baths and seek to maintain, sometimes unsuccessfully, organic additives at or below a nominal or desired level.

In some example embodiments of the present disclosure, full in-line solids extraction of organic additives and byproducts from the inorganic components of an electroplating bath is provided. This solids extraction allows costly inorganic metal salts and other inorganic components to be purified so to contain only low levels of unhelpful byproducts and to be recycled or reused.

Figure 2:
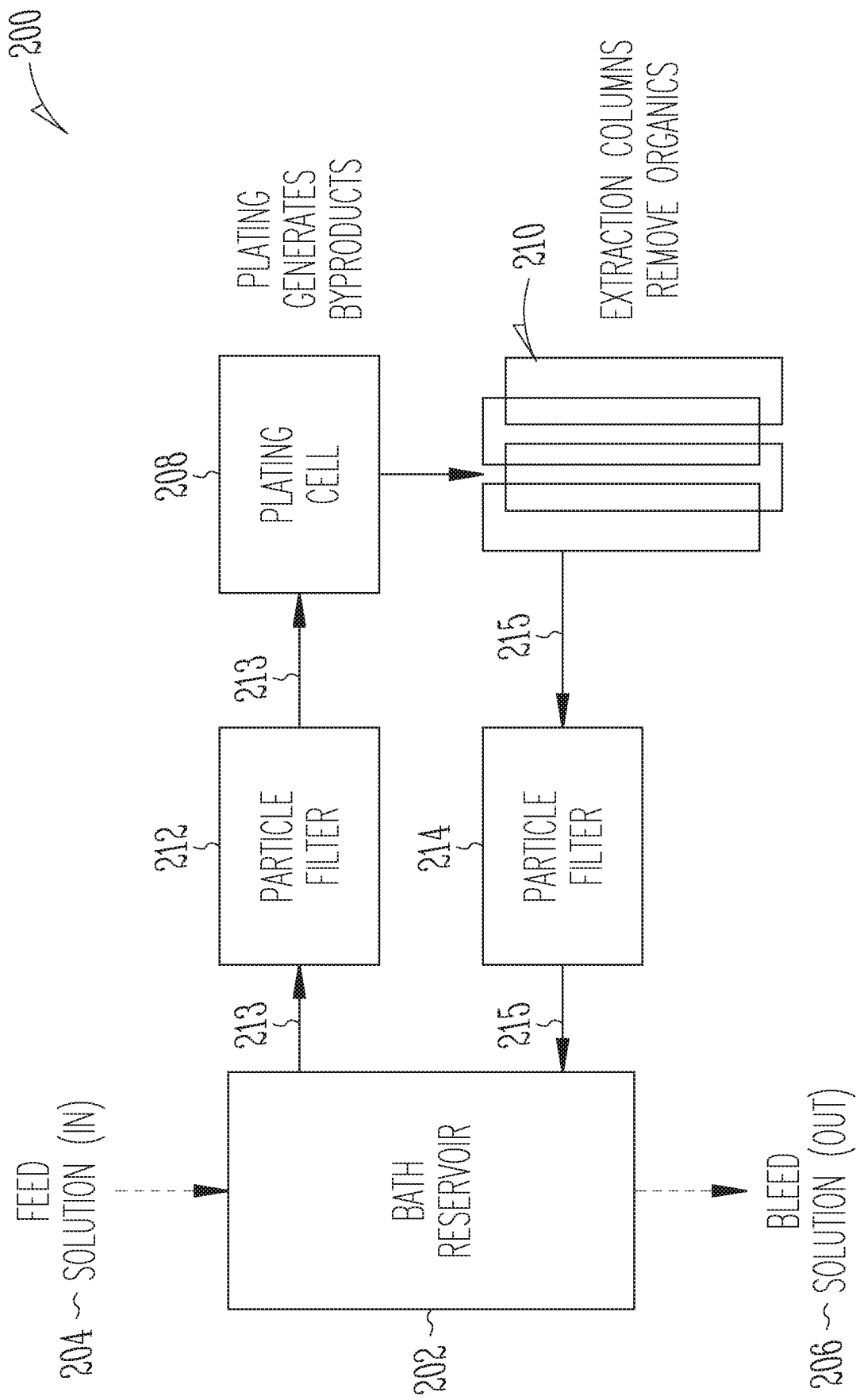
FIG. 2 is a schematic diagram of an electroplating system, according to an example embodiment.

FIG. 2 illustrates an extraction and filtration arrangement that may be employed in this regard. The illustrated electroplating system 200 circulates plating fluid (or solution) and includes a bath reservoir 202, a feed solution inlet 204, a bleed solution outlet 206, a plating cell 208 and a solids extraction column, in this case a set of solids extraction columns 210. A particle filter 212 is disposed in a fluid pathway 213 between the bath reservoir 202 and the plating cell 208, and another particle filter 214 is disposed in a fluid pathway 215 between the extraction columns 210 and the bath reservoir 202, as shown. The example system 200 employs the in-line extraction columns 210 and the particle filter 214 to capture particle shedding from the extraction columns 210 downstream of the plating cell 208. In this arrangement, the extraction columns 210 may be configured to remove all organic materials, some organic material, or selectively remove certain undesired organic byproducts and leave some undegraded organic additives to flow back into the reservoir bath 202 via the fluid pathway 215.

Figure 3:
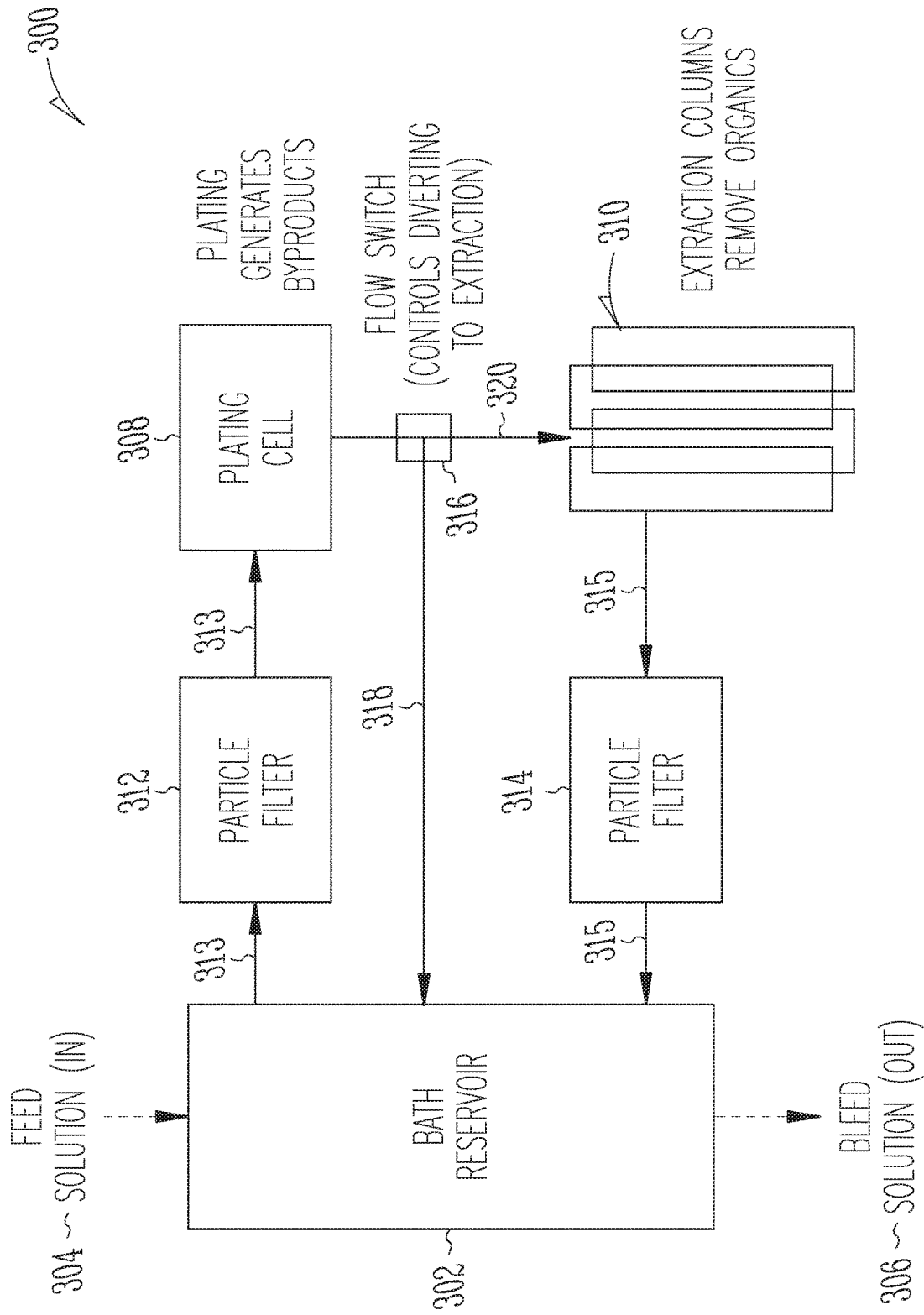
FIG. 3 is a schematic diagram of an electroplating system, according to an example embodiment.

In some example embodiments of the present disclosure, partial in-line solids extraction of organic additives and byproducts of inorganic components of an electroplating bath is employed in combination with bleed and feed operations. FIG. 3 illustrates an extraction and filter arrangement that may be employed in this regard. The illustrated system 300 circulates plating fluid and includes a bath reservoir 302, a feed solution inlet 304, a bleed solution outlet 306, a plating cell 308 and a solids extraction column, in this case a set of solids extraction columns 310. A particle filter 312 is disposed in a fluid pathway 313 between the bath reservoir 302 and the plating cell 308, and another particle filter 314 is disposed in a fluid pathway 315 between the extraction columns 310 and the bath reservoir 302, as shown.

In this example, monitoring software and switching valves 316 are provided downstream of the bath reservoir 302 and are configured to control and permit fluid flow to the extraction columns 310 at specific times or periodic intervals, as desired. Fluid flow may be controlled from fully free to fully prevented, in some examples. Intermediate flow control points may be set. In one example, the diversion of fluid to the extraction columns 310 is permitted by control loop 320, while another control loop 318 allows plating fluid to return to the bath reservoir 302. Flow of plating fluid may be diverted entirely to the extraction columns 310 for solids extraction, or allowed to return fully to the reservoir bath 302 though control loop 318 without passing through the extraction columns 310 at all. A range of positions in between "full extraction" (solids extraction) and "full return" (bleed and feed) is possible to provide the combination arrangement of partial in-line solids extraction of organic additives and byproducts of inorganic components as mentioned above The system 300 illustrated in FIG. 3 may include software controls, degradation algorithms, and chemical monitoring means working in conjunction to determine when fluid flow occurring after the plating cell 308 should be diverted to the extraction columns 310. In some examples, levels and constituents of the bath reservoir 302 are dynamically measured by associated chemical monitoring means or through predictive algorithms. In one example, the combined operation of these components intermittently purifies the bath and maintains additive and byproduct levels at a specified level.

In further examples of the present disclosure, off-line (or external) solids extraction of organic additives and byproducts from the inorganic components of an electroplating bath is employed in combination with bleed and feed operations. In certain modes of operation of these examples, used electrolyte is selectively passed to an offline treatment unit in a recycling operation.

Figure 4:
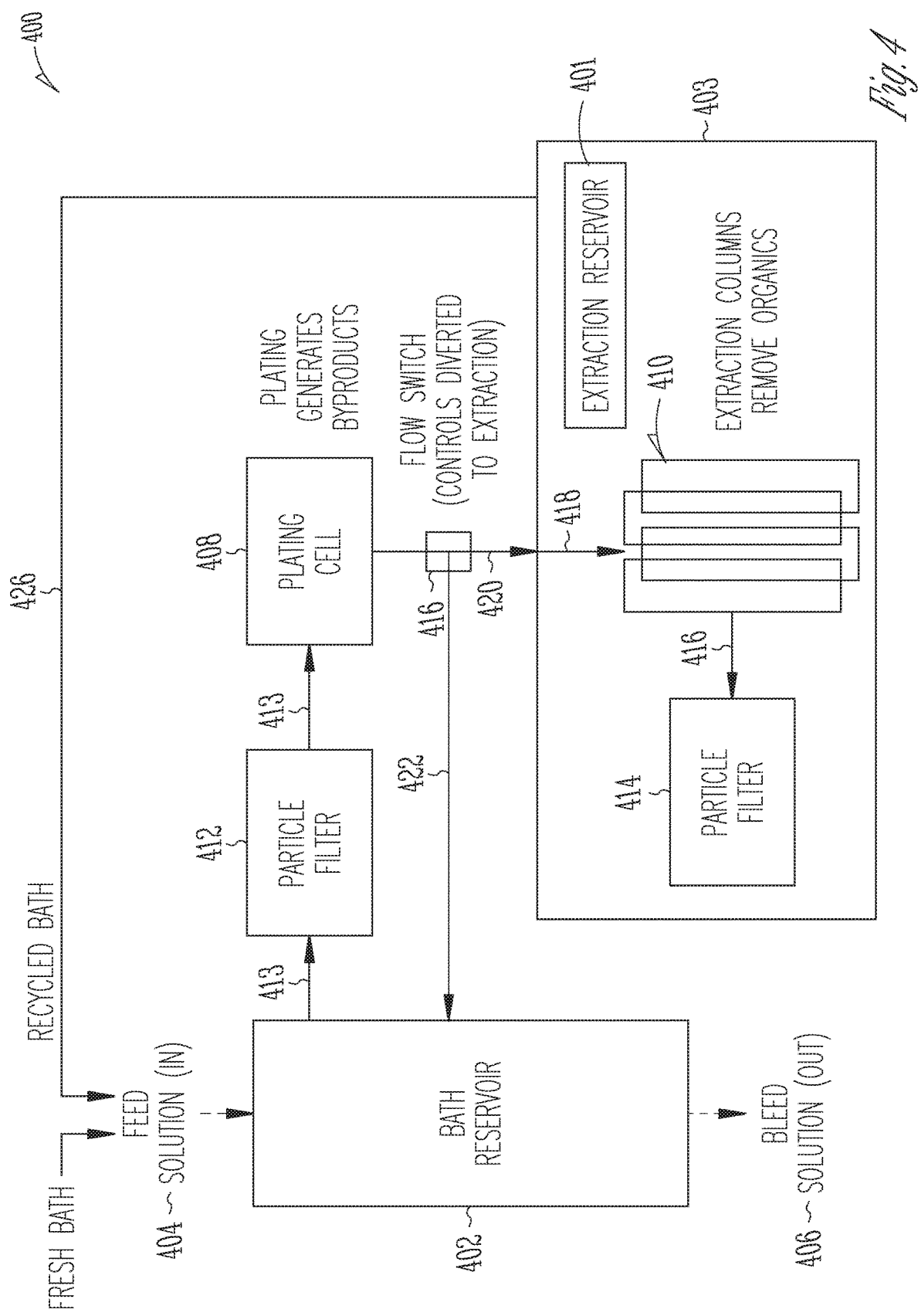
FIG. 4 is a schematic diagram of an electroplating system, according to an example embodiment.

FIG. 4 illustrates an extraction and filter arrangement that may be employed in this regard. The view shows a system 400 that may incorporate elements from the systems depicted in FIG. 2 and FIG. 3. Thus, the system 400 may include a bath reservoir 402, a feed solution inlet 404, a bleed solution outlet 406, and a plating cell 408. A particle filter 412 is disposed in a fluid pathway 413 between the bath reservoir 402 and the plating cell 408. In this arrangement, however, the system 400 includes an additional, external bath or extraction reservoir 401 provided as part of an external extraction module 403. The extraction module 403 extracts and filters used plating solution from the system 400 and to this end includes a solids extraction column, in this case a set of solids extraction columns 410, and a particle filer 414. The solids extraction columns 410 and particle filter 414 are in fluid communication with the extraction reservoir 401 by means of fluid pathways 418 and 416, respectively.

In some examples, monitoring software and switching valves 416 are provided downstream of the bath reservoir 402 and are configured to control and permit fluid flow to the extraction reservoir 401 at specific times or periodic intervals, as desired. Fluid flow to the external extraction module 403 may be controlled from fully free to fully prevented, in some examples. Intermediate flow control points may be set. In one example, the diversion of fluid to the extraction module 403 is permitted by a control loop 420, while another control loop 422 allows plating fluid to return to the bath reservoir 402. Flow of plating fluid may be diverted entirely to the extraction module 403 for solids extraction, or allowed to return fully to the reservoir bath 402 though control loop 422 without passing through the extraction module 403 at all. A range of positions in between "full extraction" (solids extraction) and "full return" (bleed and feed) is possible to provide the combination arrangement of off-line solids extraction of organic additives and byproducts of inorganic components as mentioned above. Plating fluid leaving the extraction module 403 can return to the bath reservoir 402 as recycled bath fluid via fluid pathway 422 and can be dosed with fresh organic additive as needed. The system 400 may be used, in some examples, for extensive extraction, long extraction times, or slow movement of fluids through the extraction columns 410 or an extraction bed.

By passing electroplating solutions, such as a cobalt solution containing organic additives, through solids extraction columns 410, as described herein, it is possible to screen materials that will capture organic molecules and remove them from solution, while allowing metal salts in solution to flow through. Columns that can be used to purify cobalt electroplating baths may employ three mechanisms of extraction, namely polarity, electric charge, and size.

Example classes of extraction materials that can be used to remove constituents from electroplating baths may include those discussed below. These classes of materials are typically bound to silicon (Si) or polymer beads, a mesh, or a matrix that can be packed into the housing of a solids extraction column 410. An example solids extraction column 410 includes inlets and outlets in fluid communication with a fluid source, such as a bath reservoir.

For retaining non-polar molecules, extraction materials may include one or more of the following: an 18-carbon chain (C18), 8-carbon chain (C8), phenyl, cyanopropyl, and styrene/divinyl benzene. For retaining polar molecules, extraction materials may include one or more of the following: Si—OH, Si—NH2, silica gel, and alumina. For retaining charged molecules, extraction materials may include one or more of the following: amino propyl, carboxylic acid, quaternary amine, and sulfonic acid. For retaining different sizes of molecules, extraction materials may include one or more of the following: packed silica or polymer heads for obtaining pores of sizes between 50-300 nm.

In some examples, the materials listed above can be used singularly, as a stack of sequential or mixed materials in the same solids extraction column 410 (for example, C18 and SiOH), or as a grouping of materials in a series of filters. In some examples, different combinations of filter materials are employed for extraction of organics from baths that have multiple organic additives types, for example polar and nonpolar sizes.

Figure 5:
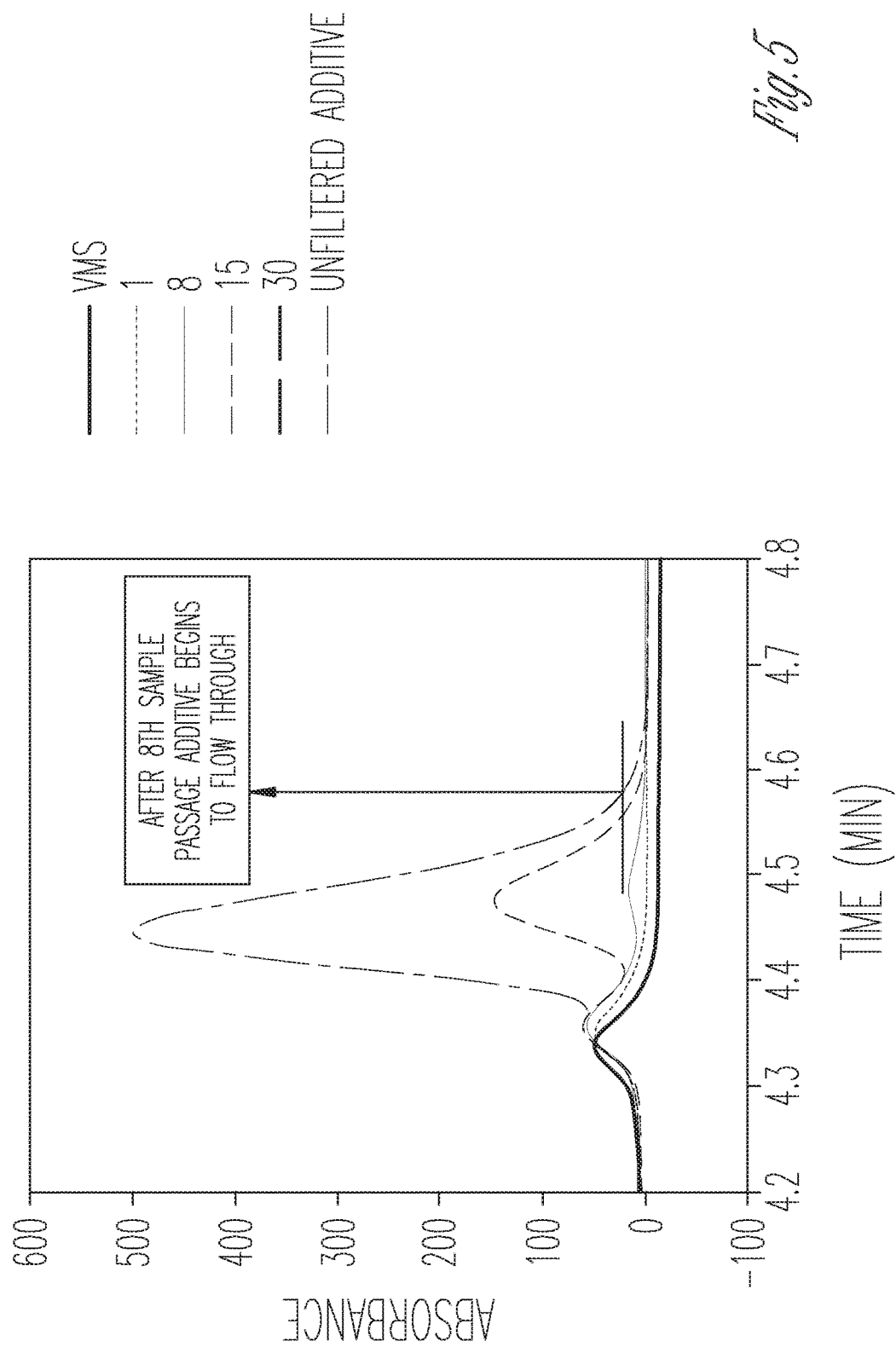
FIGS. 5-6 are graphs depicting the different abilities of two material; to bind and extract cobalt electroplating additives from an electroplating solution that is passed through an extraction column, according to example embodiments.
Figure 6:
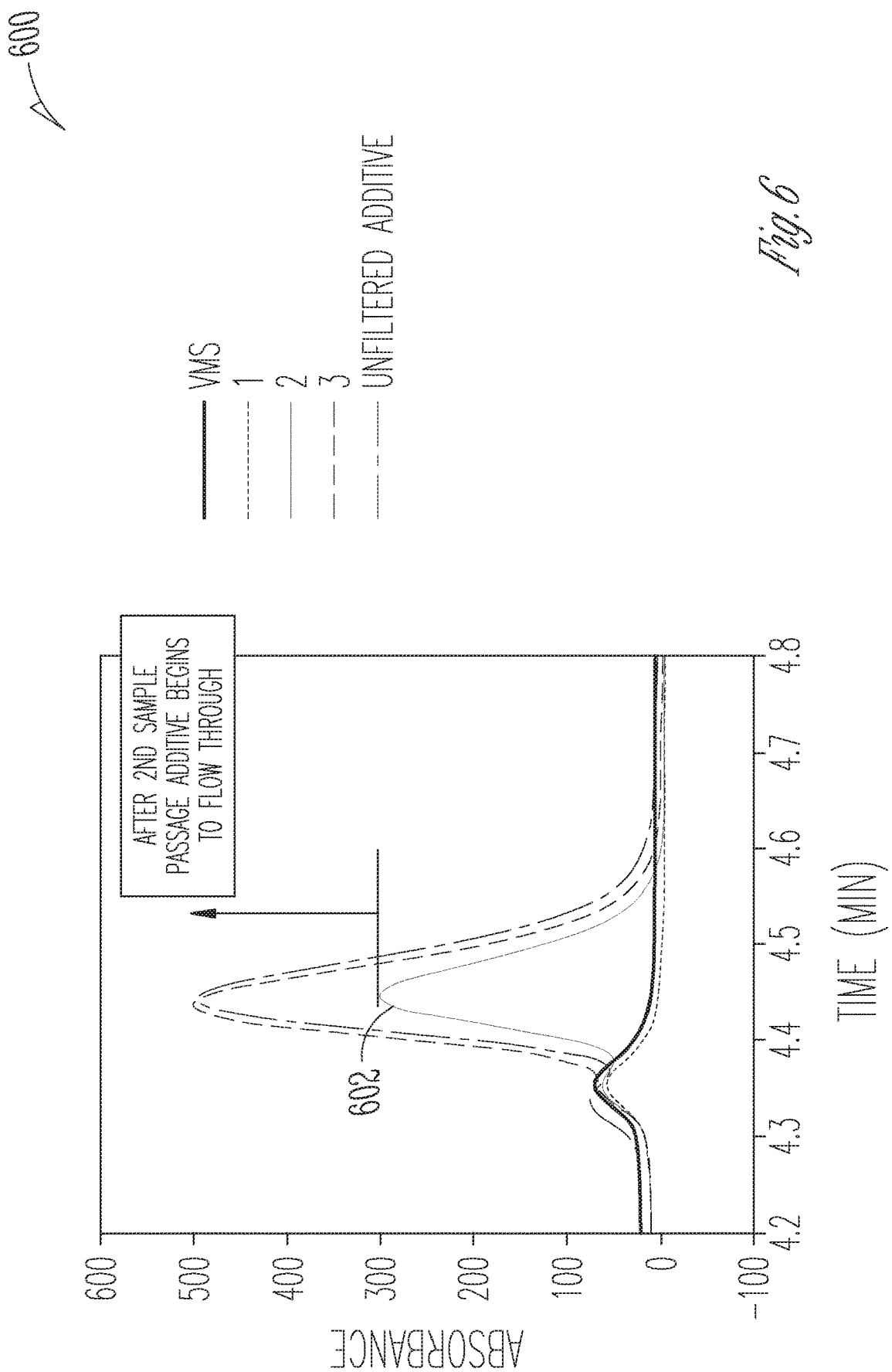

FIGS. 5 and 6 include graphs 500 and 600 depicting representations of the respective abilities of two materials to bind and extract cobalt electroplating additives from a plating solution that is passed through a solids extraction column 410, or a set of them of the type described above. The units of the axes of the graph are as indicated. The virgin make-up solution (VMS) includes a bulk electrolyte comprising one or more of cobalt sulphate, boric acid, and sulfuric acid. The unfiltered additive includes VMS with an organic additive. The very high peak in the plot line for the unfiltered additive corresponds with High Pressure Liquid Chromatography (HPLC) detecting the additive in the sample. The sample numbering 1, 8, 15, and 30 in the graph indicate the passage of VMS with organic additive through the solids extraction column, and the peaks in the respective plot lines are seen to increase in size as the column starts failing to capture the organic additive and it bleeds through the column where it can be detected by HPLC.

FIG. 5 illustrates an HPLC chromatograph of thirty sample volumes passed through a solids extraction column matrix of styrene-divinyl benzene. It may be observed that after the eighth sample was run on this column, the electroplating additive began to flow through the column and was detected by UV-vis absorbance. FIG. 5 records that, in one example, up to eight sample volumes were passed through the styrene-divinyl benzene column before the column started to allow organic additive to begin flowing through the column and no longer be retained (or extracted). From sample eight to around sample twenty-five the amount of organic additive that flowed through the column increases as the extraction materials' retention (or binding) sites were filled. In this regard, reference may be made to the graph 700 in FIG. 7 which depicts a plot of additive concentration for all sample portions run through the styrene-divinyl benzene extraction column. The graph 700 records that samples twenty-five to thirty overlap with unfiltered additive concentration meaning that at some point the column has reached its capacity and is unable to capture more material.

FIG. 6 illustrates an HPLC chromatograph of three sample volumes passed through a carbon filled solids extraction column. It may be observed that, after the first sample was run on this column, the additive began to flow through the column and was detected by UV-vis absorbance. This result indicates that retention (or binding) sites in the extraction material in the solids extraction column 410 are retaining (extracting) additives but are full and so they are unable to continue to capture the additives in further samples. The peak 602 in the graph 600 occurring between 4.4 and 4.5 minutes is indicative of the presence of organic additive in the bath.

FIG. 6 highlights behaviour which may be observed when the same additive concentration and volume is passed through a solids extraction column 410 including carbon. In one example carbon column, only the first sample appears to have had all organic additives extracted from it, as evidenced by the lack of a UV-vis absorbance peak. The second sample begins flowing through the column and sample three is seen to overlap with the unfiltered additive meaning that the column was unable to capture more material. This data is strongly indicative that the carbon filled column captured less additive than the styrene/divinyl benzene column.

The data shown in FIGS. 5 and 6 for each solids extraction column 410 type was collected using the same weight of packing material for both column types, and the same concentration and volumes of sample passed through the columns. By knowing the weight of packing material and the weight of additive provided in solution tables a capture efficiency can be created for each column.

In this regard, Table 1 below lists the capture efficiency in milligrams (mg) of column packing material for a given weight in milligrams (mg) of additive material. It will be seen that a carbon column uses approximately four times as much weight (2000 mg versus 500 mg) of packing material in order to capture an equivalent amount of additive.

| Styrene-Divinyl Benzene | Carbon |
|---|---|
| 500 mg | 2000 mg |

This data can be extrapolated or otherwise used, for example, to design and scale solids extraction columns 410 for various bath sizes and additive concentrations.

Figure 7:
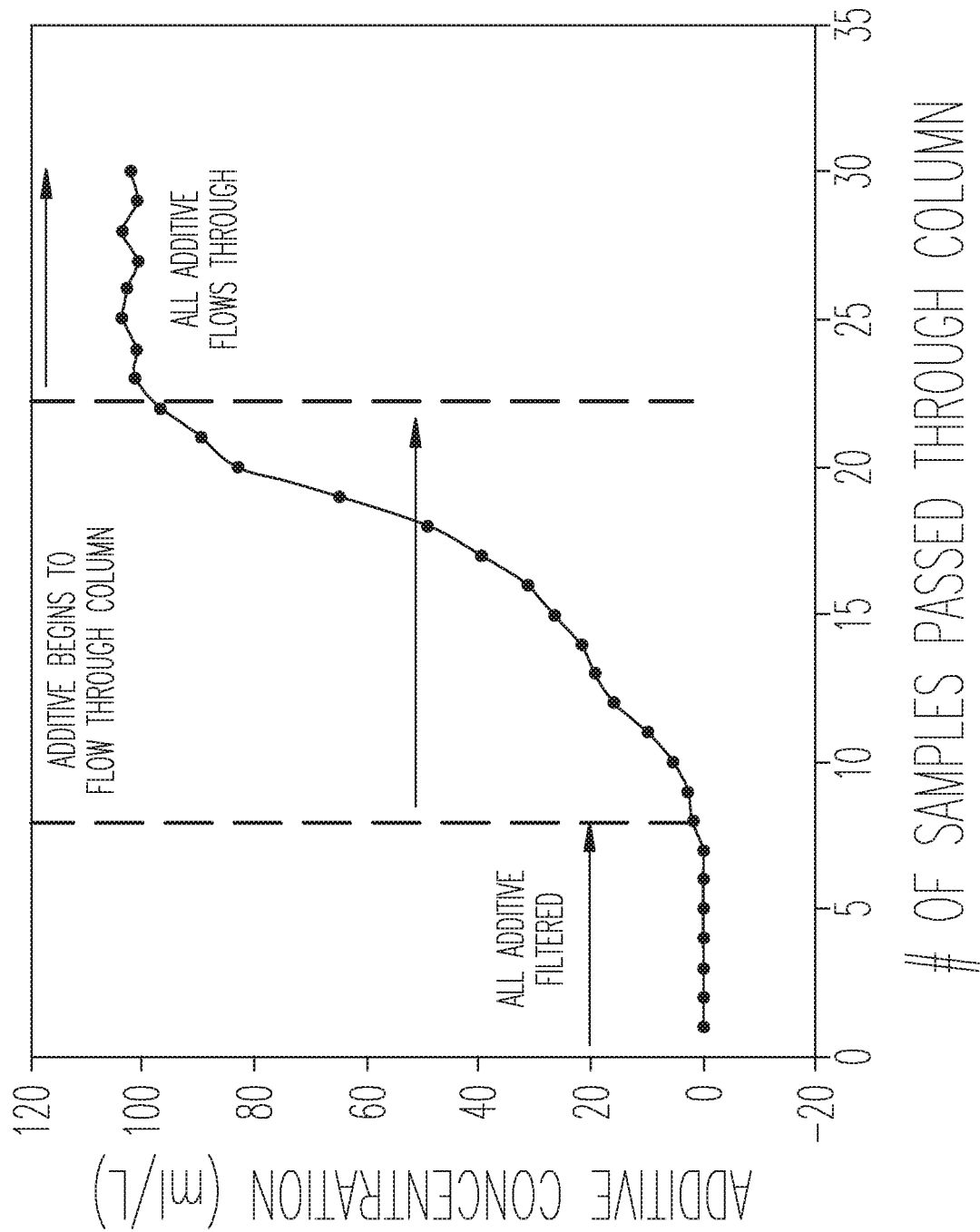
FIG. 7 is a graph depicting a plot of an additive concentration for sample portions run through a styrene-divinyl benzene extraction column, according to example embodiments.

Referring to FIG. 7, this graph also provides trend information on the gradual failure of the styrene-divinyl benzene column to capture organic additive that passes through it. The data shown in FIG. 7 was generated using the same series of samples and data as those used to produce the results in FIG. 5. The UV-vis absorbance was converted to an equivalent concentration value using a calibration curve. The results in FIG. 7 are also indicative that extraction columns 410 used in production environments with high use rates will either need to be replaced or reconditioned reasonably frequently to remove bound organic additives and free up binding sites. Without wishing to be bound by theory, it is believed that the number of cycles a solids extraction column lasts is related to the number of chemical functional group binding sites the column has in its extraction matrix. In this case, the column has enough binding sites to bind a limited fraction of the organic additive in the bath.

Figure 8:
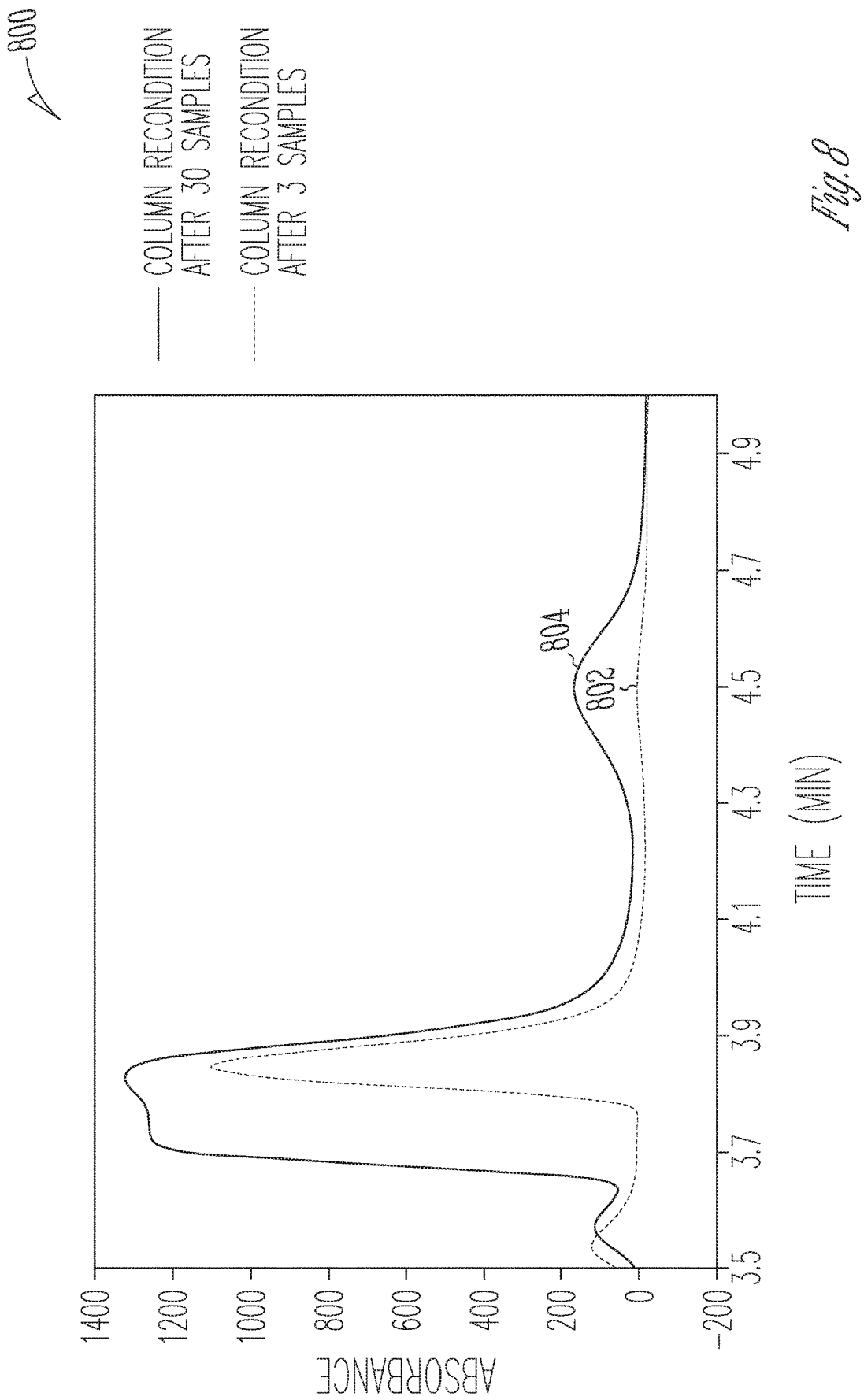
FIGS. 8-9 are graphs illustrating results of a method for reconditioning an extraction column by flowing an organic solvent through the column to dissolve additives off the solids extraction matrix, according to example embodiments.
Figure 9:
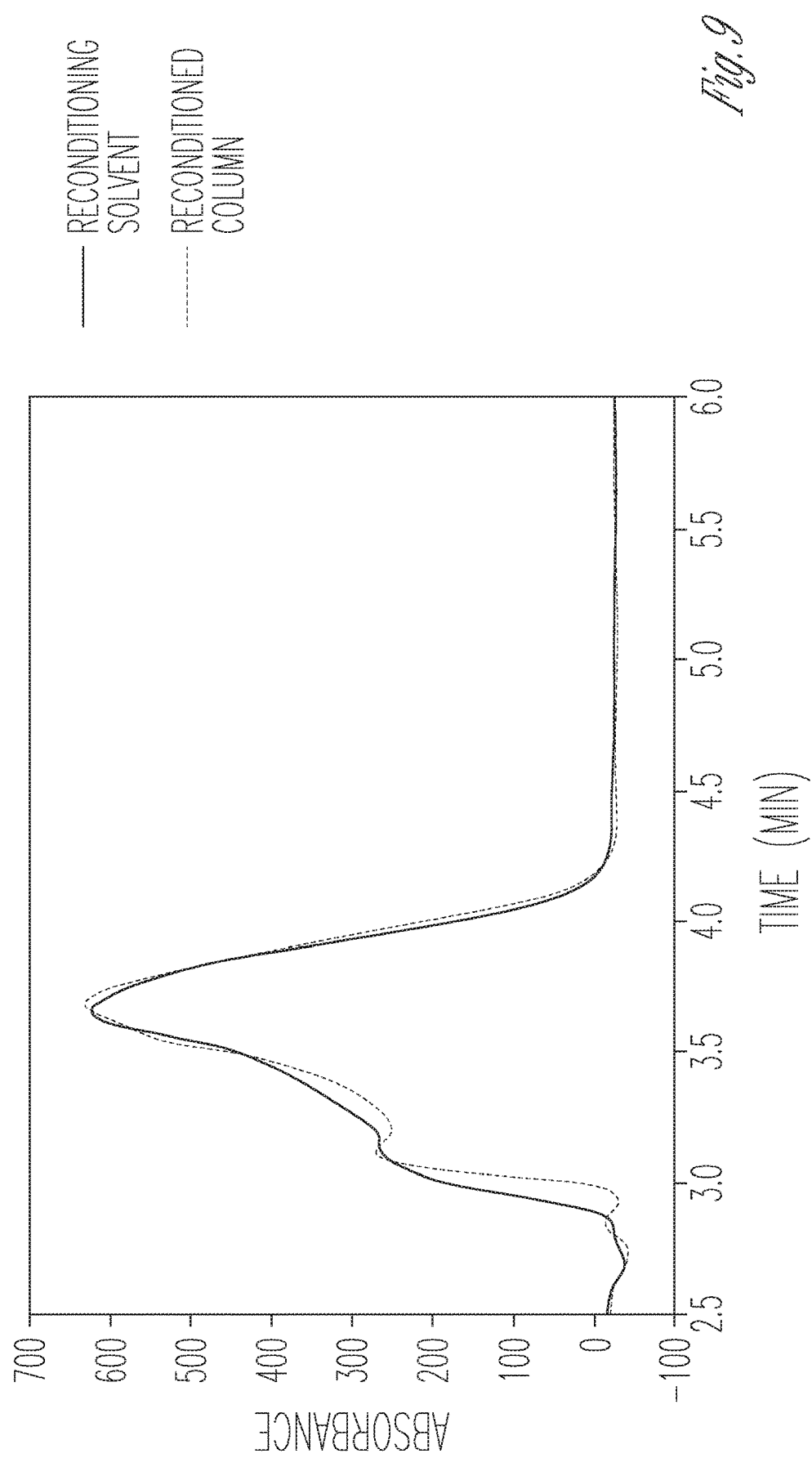

The views in FIGS. 8 and 9 illustrate, in graphs 800 and 900, example results for an example method for reconditioning solids extraction columns 410. The method includes, in one aspect, allowing an organic solvent to flow through an extraction column 410 to dissolve retained (extracted) additive off the solids extraction matrix. The graph of plot lines 802 and 804 in FIG. 8 shows reconditioning results for the removal of retained material off a styrene-divinyl benzene extraction column after respective sets of three and thirty sample cycles. It may be seen, from the larger peak area at 804, that the column with thirty samples run through it has retained more additive than the column with three sample runs. The plot in FIG. 9 shows that the column can be returned to a state very close to its original with substantially restored additive-extraction ability. In this example, reconditioning solvent was the only material flowing through the reconditioned column.

The results depicted in FIGS. 8 and 9 indicate the substantially complete removal of captured additive from three or thirty samples run through a solids extraction column 410. Removal of the captured material from the column can allow the column to be reused as the capture sites on the extraction column 410 are free.

In certain configurations, such as the system configurations shown in FIGS. 2-4, it may be desired to monitor organic and inorganic concentrations in the electrolyte before and after the solids extraction columns 410 to obtain online data to generate the results in FIGS. 5-9. These operations can be done, for example, through fluid sampling by Cyclic Voltammetry Stripping (CVS) or HPLC techniques. CVS is an analytical technique used in a production environment to detect an organic additive in a bath.

In some examples, a convenient element of the system configurations shown in FIGS. 2-4 allows for both quick replacement of the solids extraction column(s) 410 and the reconditioning of columns with minimal to no tool downtime. Significant cost in water production can be caused by the downtime of manufacturing tools for preventative maintenance schedules, so it may be convenient to include elements that may be replaced or reconfigured automatically without taking a tool out of production. In certain configurations, some or all of these design elements might be combined to allow for both replacement of filters and automated reconditioning of columns.

Convenient design elements to allow filter replacement with a tool still running may include one or more of the following in some examples: isolation valves on the inlet or outlet of filters, fluid lines allowing each particle filter 212-214, 312-314, and 412-414 to be taken out of operation independently while fluid still passes through other filters or solids extraction columns 410, fluid lines that allow routing of independent drain and water or solvent rinse lines to each filter housing. This may allow filters to be cleaned as needed to render them ready to be removed from a tool. The above enhancements may also improve the safety of filter removal operations.

Further enhancements may include an aspiration pump to remove rinse fluids from lines, column housings, and the particle filters 212-214, 312-314, and 412-414. Some example embodiments include redundant filters that fluid can be switched to flow through to handle the overall flow rates in use. These design elements apply to the in-line and off-line extraction columns. Convenient design elements to allow for automation of filter reconditioning may include, for example, some or all of the aspects described below.

The system 1000 shown in FIG. 10, for example, includes a solids extraction column 1002 that can be flushed with an organic solvent to dissolve organic additives off the extraction column. The extraction column 1002 has a housing 1018. The system 1000 includes automated and fluid feed-in valves 1016 for water 1008, an electrolyte 1010, and a solvent 1012, as shown. The valves 1016 can be used to automate rinsing and reconditioning of the extraction column 1002. The system 1000 also allows for draining (by valve 1014) and isolating the column (by isolation valves 1004 and 1006) as needed without interrupting operation of the electroplating system (or tool) 200, 300 or 400 in FIGS. 2-4. With appropriate adaptations, a similar operation can be performed for an electroplating tool using the particle filters 212-214, 312-314, and 412-414 illustrated in FIGS. 2-4.

Conveniently, the design elements that allow for filter replacement as described herein may also be used for reconditioning a column while an electroplating system (such as system 200, 300 or 400) is still running. Further, values similar to those derided in Table 1 above can be used to estimate column failure based on the weight of the extraction bed and the weight of organic additives in solution. In a further aspect, software algorithms may be adopted to predict column failure and run automated preventative maintenance to flag the need for column reconditioning before column failure. In this regard, the results tabled in FIG. 11 provide an example output of certain calculations and tracking operations employed for determining or predicting extraction column failure.

FIG. 12 illustrates example operations in an automated reconditioning method 1200 that can be run on an extraction column 1002 as part of automated preventative maintenance. The method allows reconditioning of columns in an electroplating system. The reconditioning method includes, at 1202, isolating a column; at 1204, draining the column (more specifically its housing 1018); at 1206, rinsing the column with water, solvent 1012 and electrolyte 1010, as needed; at 1208, draining the column (or its housing 1018) again; and, at 1210 introducing plating solution into the column. Aspects of the operation 1206, i.e. the rinsing with water, solvent 1012, and electrolyte 1010 may be selected depending on the column size, solids matrix, and additive in use. In some examples, a solids matrix includes a particle sizing mesh, for example in the range 18×10 mesh to 18×500 mesh. The reconditioning of the column can be directly confirmed by chemical monitoring of additive concentrations before and after extraction. For example, in the HPLC plot of FIG. 5 one can conclude that a solids extraction column has been satisfactorily reconditioned if, after the reconditioning operation, no or very minimal additive bleed through the column is observed.

The value determined for additive weight that is being retained in (extracted by) the column to determine column failure can be determined in three example methods. A first method uses measurement with metrology and tracking of concentration before and after passing solutions through the extraction column 1002. Here, the difference is indicative of an amount of additive trapped in the column. A second, method uses predictive estimates based on known breakdown constants in milligrams (mg) of material per A*hr of current passed. A third method uses a combination of measurement metrology and predictive forward estimates.

In order to recondition a column, the operations described above can be controlled by software as shown, for example, in FIG. 12. In some examples, the reconditioning of columns, additive breakdown, additive removal, and additive concentrations may include the use of software algorithms and chemical monitoring. Solvents 1012 used for reconditioning may be dependent on the additive to be removed and the extraction matrix used. Common solvents 1012 used to recondition columns can be found on polarity reference charts.

Software controls of the present extraction system may include current monitoring, dosing algorithms, and bleed and feed operations, control specifications that indicate when automated reconditioning of columns should take place (such as for example, as shown in FIG. 7). Control specifications may use estimated calculations of additive breakdown product that is building up in the bath, for example, calculated from data similar to the plot shown in FIG. 1 ml per A*hr, or measured values from chemical metrology, such as cyclic voltammetric stripping (CVS), or high-pressure liquid chromatography (HPLC), and others. Pre-set specifications can be used to determine when automated diversion of electrolyte 1010 should occur to run used electrolyte 1010 through extraction columns 1002 or to an external module (for example, FIGS. 2-3). This diversion may occur using a switch valve and, in some examples, a flow meter to divert a known amount of solution at a known concentration to the extraction column 1002. In this way, a very specific amount of by-product can be extracted from the bath and then the solution can be recycled to keep the bath under a certain specification of by-product with minimal use of extraction columns 1002. This concept is further described with reference to FIG. 13.

FIG. 13 is a diagram indicating example control points and operations in a method 1300 for an electroplating system (for example system 200, 300, or 400) to predictively and automatically divert portions of an electroplating bath solution which may contain degraded byproducts that have built up in it.

The method 1300 includes, at 1302, measuring or predicting an additive in an electroplating solution and, at 1304, measuring or predicting a by-product in an electroplating solution. The additive and/or by-product may be a constituent in a solution present in, fed into, or bled from a bath reservoir of the type shown at 202, 302, and 402 in FIGS. 2-4, for example. The method 1300 further includes, at operation 1306, setting a specification for both the additive and the by-product constituents. At operation 1308, the method 1300 includes setting the specification using measurement and or a prediction of a breakdown time or current passed (e.g. ml per A*hr). At operation 1310, and in a negative degradation loop 1311, the method 1300 identifies a degradation less than the set specification and, at operation 1312, returns solution to the reservoir bath (200, 300 or 400) for reuse.

The method 1300 further includes, in a positive degradation loop 1313, operation 1314 identifies a degradation more than the set specification and, at operation 1316, diverts some portion of the reservoir bath solution to one or more extraction columns 1002, for example the sets of extraction columns depicted at 310 and 410 in FIGS. 3-4. At operation 1318, the volume of the diverted portion of the solution may be dependent on a calculated removal needed, and/or a column capture efficiency. At operation 1320, the electrolyte solution is recycled without additive or by-product (these have been extracted) to the bath reservoir. In one example, the recycled electrolyte solution is dosed with an additive to match the corresponding specification in the plating bath reservoir.

The above operations can control byproducts in an electroplating bath solution reservoir (302, 402) by processing feedback from predictive algorithms regulating or monitoring the breakdown of additives and/or the chemical metrology of the bath solution concentrations. Thus, in some examples, the operations may include diverting solution to the extraction columns 310, 410 only when needed (as may be employed for example in the systems 300 and 400 illustrated in FIGS. 3-4), rather than filtering the solution continuously (as may be employed for example in the system 200 illustrated in FIG. 2).

One example arrangement also includes a control system for switching valves 316, 416 and selectively operating a pump to drive the reconditioning of an extraction column 310, 410, while allowing an electroplating system to continue processing wafers. Further controls which may be configured include those for feeding recycled electrolyte free of additives back to a plating bath reservoir, for example, or to dose recycled electrolyte including specified additive concentrations.

The example designs shown in FIGS. 2-4 include particle filters (214, 314, 414) positioned downstream of the extraction columns (210, 310, 410) to remove particulate matter that might be shed by the extraction columns 210, 310, 410. The filters can help to prevent increased particle counts from passing into the respective bath reservoirs (202, 302, 402). The particle filters (214, 314, 414) can include quick-change components and housings like those described above for the extraction columns 210, 310, 410.

Turning back to FIG. 4, this view depicts a system 400 in which additive and by-product extraction can be performed in an external (or off-line) separate module away from the electroplating circuit per se to recycle inorganic electrolytes and remove organic additives. This arrangement may be useful, for example, to handle extractions that take significant amounts of time and may not allow simple flow through of electrolytes. In some examples, this mode of operation employs many or all of the design elements described above (including filter replacement and automated preventative maintenance), but may also include additional bath reservoirs for containing used electrolyte and recycled electrolyte downstream of the extraction columns 410. The additional holding reservoirs may enable flexibility in the separate module's ability to remove organic materials from electrolyte that might be sourced from a diverse range of applications. A holding reservoir for recycled electrolyte also enables the retained solution to be fed back to the electroplating circuit per se through bleed and feed operations similar to the way fresh unused electrolyte is recycled. In some embodiments, the offline or separate extraction module 403 is integrated with an independent chemical monitoring system to confirm the extraction of organics from the electrolyte 1010 before bleed and feed operations return the electrolyte 1010 back into the main plating bath reservoir 402 on the electroplating tool.

Some features of the systems herein described may include lower electroplating bath consumption leading to lower cost of tool ownership and lowered cost to produce wafers, automated control of by-product build-up in bath to a set specification using current schemes for dosing, bleed and feed, combined with new extraction system described. The systems and methods minimize user inputs after setup and can improve ease of use and the automated reconditioning of extraction columns 210, 310, 410 through software. This may lead to lower costs due to filters being reused for longer amounts of time. The improved designs may also allow filter replacement without taking tools offline and unavailable for making product, leading to lower overall cost of tool ownership.

Thus, in some examples, there is provided an electroplating system comprising: a bath reservoir having a first inlet for feeding fresh electrolyte solution into the bath reservoir and a first outlet for bleeding used electrolyte solution out of the bath reservoir, a second inlet for receiving recycled electrolyte solution into the bath reservoir, and a second outlet for discharge of electrolyte solution from the bath reservoir; a plating cell for electroplating an object, the plating cell having an inlet in direct or indirect fluid communication with the bath reservoir, and an outlet for discharge of electrolyte solution from the plating cell; an extraction column for extracting by-products generated by the plating cell, the extraction column having an inlet in direct or indirect fluid communication with the outlet of the plating cell, and an outlet for discharge of electrolyte solution from the extraction column; a first particle filter disposed in a fluid pathway between the second outlet of the bath reservoir and the inlet of the plating cell; and a second particle filter disposed in a fluid pathway between the outlet of the extraction column and the second inlet of the bath reservoir.

In some examples, the electroplating system further comprises flow control means, in fluid communication with the outlet of the plating cell, for selectively diverting a portion of electrolyte solution discharged by the plating cell to the extraction column, or returning a portion of the electrolyte solution to the bath reservoir.

In some examples, a diversion of electroplating solution by the flow control means to the extraction column is based on a monitored level of by-product or additive in the plating cell.

In some examples, the electroplating system further comprises an external recycling loop comprising an extraction reservoir for receiving electrolyte solution diverted by the flow control means; the extraction column, the inlet of the extraction column being in fluid communication with the extraction reservoir; and an external particle filter having an inlet in fluid communication with the extraction column and an outlet in fluid communication with the bath reservoir.

In some examples, the external particle filter is constituted by or includes the second particle filter removed from the fluid pathway between the outlet of the extraction column and the second inlet of the bath reservoir.

In some examples, the electroplating system further comprises flow control means, in fluid communication with the outlet of the plating cell, for selectively diverting a portion of electrolyte solution discharged by the plating cell to the external recycling loop, or returning a portion of the electrolyte solution to the bath reservoir.

In some examples, the extraction column includes a solids extraction matrix including an extraction material for capturing the byproduct generated by the plating cell. In some examples, the extraction material includes one or more of: an 18-carbon chain (C18), 8-carbon chain (C8), phenyl, cyanopropyl, and styrene-divinyl benzene. In some examples, the extraction material includes one or more of: Si—OH, Si—NH2, silica gel, and alumina. In some examples, the extraction material includes one or more of: an 18-carbon chain (C18), 8-carbon chain (C8), phenyl, cyanopropyl, and styrene-divinyl benzene. In some examples, the extraction material includes one or more of: amino propyl, carboxylic acid, quaternary amine, and sulfonic acid. In some examples, the extraction material includes one or more of: packed silica or polymer beads.

Figure 14:
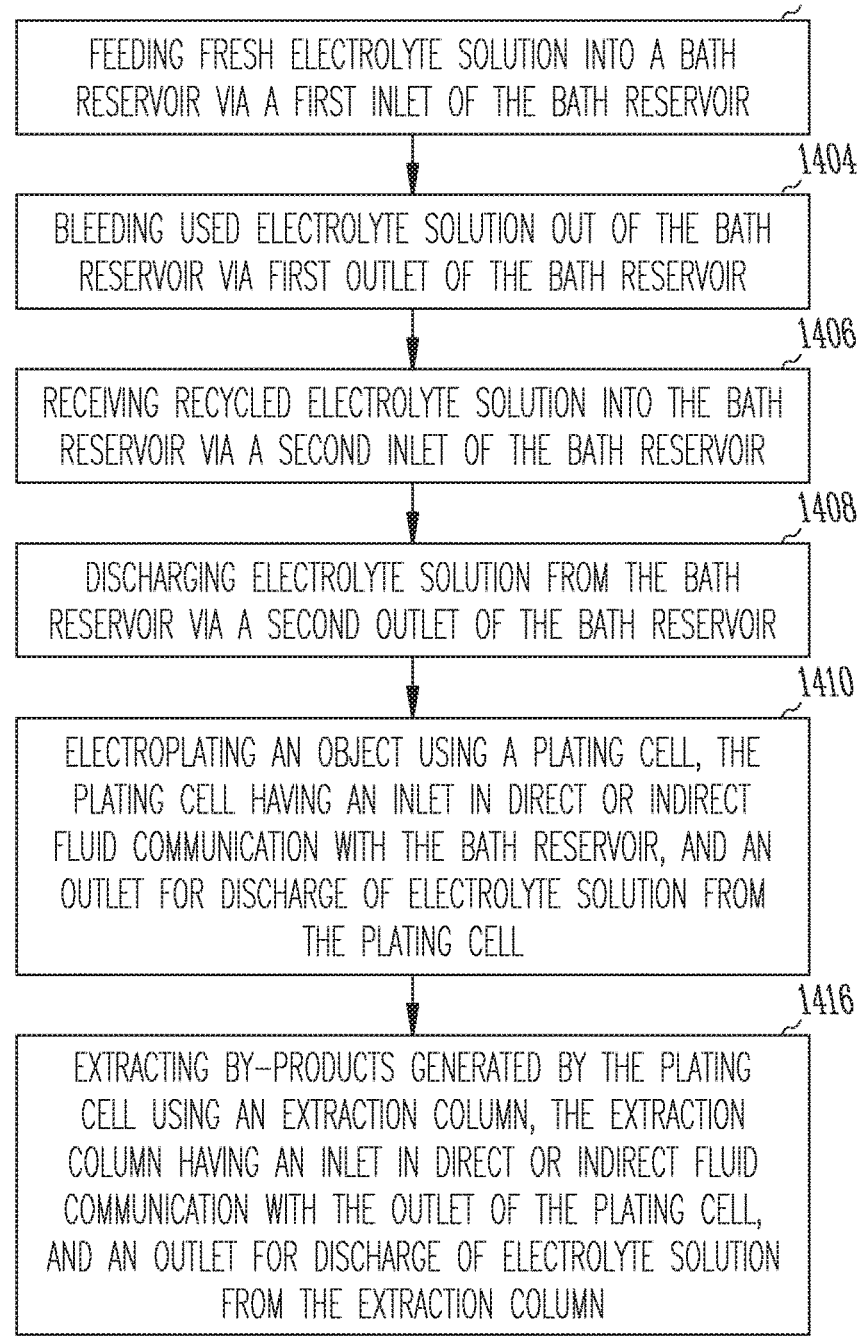
FIG. 14 is flow chart for a method for removal of electroplating bath additives, according to an example embodiment.

The present disclosure also includes example methods. In one example, with reference to FIG. 14, an electroplating method 1400 comprises, at 1402, feeding fresh electrolyte solution into a bath reservoir via a first inlet of the bath reservoir; at 1404, bleeding used electrolyte solution out of the bath reservoir via first outlet of the bath reservoir; at 1406, receiving recycled electrolyte solution into the bath reservoir via a second inlet of the bath reservoir; at 1408, discharging electrolyte solution from the bath reservoir via a second outlet of the bath reservoir; at 1410, electroplating an object using a plating cell, the plating cell having an inlet in direct or indirect fluid communication with the bath reservoir, and an outlet for discharge of electrolyte solution from the plating cell; and, at 1412, extracting by-products generated by the plating cell using an extraction column, the extraction column having an inlet in direct or indirect fluid communication with the outlet of the plating cell, and an outlet for discharge of electrolyte solution from the extraction column.

In some examples, the electroplating method 1400 may further comprise providing a first particle filter disposed in a fluid pathway between the second outlet of the bath reservoir and the inlet of the plating cell.

In some examples, the electroplating method 1400 may further comprise providing a second particle filter disposed in a fluid pathway between the outlet of the extraction column and the second inlet of the bath reservoir.

In some examples, the electroplating method 1400 further comprises reconditioning the extraction column during use of the plating cell, the reconditioning of the extraction column including, at least: isolating the extraction column from fluid communication with the plating cell; draining the extraction column of the electrolyte solution; rinsing the extraction column with a rinsing fluid containing one or more of water, a solvent, and an electrolyte; draining the extraction column of the rinsing fluid; placing the extraction column back into fluid communication with the plating cell; and introducing plating solution into the extraction column.

In some examples, the electroplating method 1400 further comprises reconditioning the extraction column based on a monitored level of by-product or additive in the plating cell.

In some examples, a non-transitory machine-readable medium includes instructions 1524 that, when read by a machine 1500, cause the machine to control operations in methods comprising at least the non-limiting example operations summarized above.

FIG. 15 is a block diagram illustrating an example of a machine 1500 upon which one or more example process embodiments described herein may be implemented, or by which one or more example process embodiments described herein may be controlled. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in a peer-to-peer (P2P) (or other distributed) network environment. Further, while only a single machine 1500 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1500 may include a hardware processor 1502 (e.g., a central processing unit (CPU), a hardware processor core, or any combination thereof), a graphics processing unit (GPU) 1503, a main memory 1504, and a static memory 1506, some or all of which may communicate with each other via an interlink (e.g., bus) 1508. The machine 1500 may further include a display device 1510, an alphanumeric input device 1512 (e.g., a keyboard), and a user interface (UI) navigation device 1514 (e.g., a mouse). In an example, the display device 1510, alphanumeric input device 1512, and UI navigation device 1514 may be a touch screen display. The machine 1500 may additionally include a mass storage device (e.g., drive unit) 1516, a signal generation device 1518 (e.g., a speaker), a network interface device 1520, and one or more sensors 1521, such as a Global Positioning System (GPS) sensor, compass, accelerometer, or another sensor. The machine 1500 may include an output controller 1528, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1516 may include a machine-readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within the static memory 1506, within the hardware processor 1502, or within the GPU 1503 during execution thereof by the machine 1500. In an example, one or any combination of the hardware processor 1502, the GPU 1503, the main memory 1504, the static memory 1506, or the mass storage device 1516 may constitute machine-readable media 1522.

While the machine-readable medium 1522 is illustrated as a single medium, the term "machine-readable medium" may include a single medium or multiple media (e.g., a centralized or distributed database, and/or associated caches and servers) configured to store the one or more instructions 1524.

The term "machine-readable medium" may include any medium that can store, encoding, or carrying instructions 1524 for execution by the machine 1500 and that cause the machine 1500 to perform any one or more of the techniques of the present disclosure, or that can store, encoding, or carrying data structures used by or associated with such instructions 1524. Non-limiting machine-readable medium examples may include solid-state memories, and optical and magnetic media. In an example, a massed machine-readable medium comprises a machine-readable medium 1522 with a plurality of particles having invariant (e.g., rest) mass. Accordingly, massed machine-readable media are not transitory propagating signals. Specific examples of massed machine-readable media may include non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks. The instructions 1524 may further be transmitted or received over a communications network 1526 using a transmission medium via the network interface device 1520.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover all adaptations or variations of various embodiments. Combinations of the above embodiments, and other embodiments not specifically described herein, will be apparent to those of skill in the art upon reviewing the above description.

What is claimed is:

1. An electroplating system comprising:
    a bath reservoir having a first inlet for feeding fresh electrolyte solution into the bath reservoir and a first outlet for bleeding used electrolyte solution out of the bath reservoir, a second inlet for receiving recycled electrolyte solution into the bath reservoir, and a second outlet for discharge of electrolyte solution from the bath reservoir;
    a plating cell for electroplating an object, the plating cell having an inlet in direct or indirect fluid communication with the bath reservoir, and an outlet for discharge of electrolyte solution from the plating cell;
    an extraction column for extracting by-products generated by the plating cell, the extraction column having an inlet in direct or indirect fluid communication with the outlet of the plating cell, and an outlet for discharge of electrolyte solution from the extraction column;
    a first particle filter disposed in a fluid pathway between the second outlet of the bath reservoir and the inlet of the plating cell;
    a second particle filter disposed in a fluid pathway between the outlet of the extraction column and the second inlet of the bath reservoir; and
    flow control means disposed between the plating cell and the bath reservoir, wherein the flow control means is in fluid communication with the outlet of the plating cell; the flow control means selectively returning a portion of the electrolyte solution to the bath reservoir without passing the returned portion through the first or second filter.

2. The electroplating system of claim 1,
    wherein the flow control means, in fluid communication with the outlet of the plating cell, is further operable to selectively divert a portion of the electrolyte solution discharged by the plating cell to the extraction column.

3. The electroplating system of claim 2, wherein a diversion of electrolyte solution by the flow control means to the extraction column is based on a monitored level of by-product or additive in the plating cell.

4. The electroplating system of claim 3, further comprising:
    an external recycling loop comprising an extraction reservoir for receiving electrolyte solution diverted by the flow control means;
    the inlet of the extraction column being in fluid communication with the extraction reservoir; and
    the second particle filter having an inlet in fluid communication with the extraction column and an outlet in fluid communication with the bath reservoir.

5. The electroplating system of claim 4, wherein the external particle filter is constituted by or includes the second particle filter removed from the fluid pathway between the outlet of the extraction column and the second inlet of the bath reservoir.

6. The electroplating system of claim 5, further comprising:
    flow control means, in fluid communication with the outlet of the plating cell, for selectively diverting a portion of electrolyte solution discharged by the plating cell to the external recycling loop or returning a portion of the electrolyte solution to the bath reservoir.

7. The electroplating system of claim 1, wherein the extraction column includes a solids extraction matrix including an extraction material for capturing the byproduct generated by the plating cell.

8. The electroplating system of claim 7, wherein the extraction material includes one or more of:
    an 18-carbon chain (C18), 8-carbon chain (C8), phenyl, cyanopropyl, and styrene-divinyl benzene.

9. The electroplating system of claim 7, wherein the extraction material includes one or more of:
    Si—OH, Si—NH2, silica gel, and alumina.

10. The electroplating system of claim 7, wherein the extraction material includes one or more of:
    amino propyl, carboxylic acid, quaternary amine, and sulfonic acid.

11. The electroplating system of claim 7, wherein the extraction material includes one or more of:
    packed silica or polymer heads.

* * * * *